US008081102B1

(12) United States Patent
Provis

(10) Patent No.: US 8,081,102 B1
(45) Date of Patent: *Dec. 20, 2011

(54) COMPRESSED CODESET DATABASE FORMAT FOR REMOTE CONTROL DEVICES

(75) Inventor: Adam P. G. Provis, Cowes (GB)

(73) Assignee: UEI Cayman, Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/928,889

(22) Filed: Dec. 21, 2010

Related U.S. Application Data

(63) Continuation of application No. 11/190,162, filed on Jul. 26, 2005, now Pat. No. 7,855,672.

(60) Provisional application No. 60/603,359, filed on Aug. 19, 2004.

(51) Int. Cl.
    *H04L 17/02* (2006.01)
(52) U.S. Cl. .................. 341/173; 341/176; 340/825.69; 340/825.22; 340/825.25; 340/825.72; 348/734; 712/233; 711/155
(58) Field of Classification Search ............. 340/825.69, 340/825.22, 825.24, 825.72, 825.25; 341/176; 348/734; 711/155; 712/233
    See application file for complete search history.

(56) References Cited

U.S. PATENT DOCUMENTS

| | | | | |
|---|---|---|---|---|
| 3,911,401 A * | 10/1975 | Lee | ............................... | 711/123 |
| 4,024,507 A | 5/1977 | Berkling et al. | ............... | 711/170 |
| 4,959,810 A * | 9/1990 | Darbee et al. | .................. | 398/112 |
| 5,099,233 A * | 3/1992 | Keenan | ........................... | 340/9.1 |
| 6,014,092 A * | 1/2000 | Darbee et al. | .................... | 341/23 |
| 6,195,033 B1 | 2/2001 | Darbee et al. | .................. | 341/176 |
| 6,260,157 B1 * | 7/2001 | Schurecht et al. | ............. | 714/6.13 |
| 6,308,317 B1 | 10/2001 | Wilkinson et al. | ............. | 717/139 |
| 6,424,285 B1 * | 7/2002 | Perdue et al. | .................. | 341/176 |
| 6,473,893 B1 * | 10/2002 | Kay et al. | ....................... | 717/116 |
| 6,819,864 B2 * | 11/2004 | Fujita et al. | .................... | 386/230 |
| 6,959,865 B2 * | 11/2005 | Walczyk et al. | ............... | 235/454 |
| 7,259,696 B1 | 8/2007 | Lee et al. | ......................... | 341/23 |
| 7,286,076 B1 * | 10/2007 | Provis et al. | ................... | 341/173 |
| 7,339,513 B1 | 3/2008 | Provis et al. | ................... | 341/173 |
| 7,362,256 B1 | 4/2008 | Provis et al. | ................... | 341/173 |
| 7,639,170 B2 * | 12/2009 | Chen et al. | ..................... | 341/176 |
| 2001/0033243 A1 * | 10/2001 | Harris et al. | ................... | 341/176 |
| 2003/0034957 A1 * | 2/2003 | Dubil et al. | ..................... | 345/158 |
| 2004/0003213 A1 | 1/2004 | Bockhaus et al. | ............. | 712/233 |
| 2004/0049667 A1 | 3/2004 | McCormick et al. | ......... | 712/233 |
| 2005/0114633 A1 | 5/2005 | Palat et al. | ..................... | 712/226 |
| 2005/0251667 A1 * | 11/2005 | Iwamoto | ........................ | 712/233 |
| 2008/0259928 A1 | 10/2008 | Chen et al. | ..................... | 370/394 |

* cited by examiner

*Primary Examiner* — Timothy Edwards, Jr.
*Assistant Examiner* — Amine Benlagsir
(74) *Attorney, Agent, or Firm* — Greenberg Traurig, LLP

(57) ABSTRACT

A database of codesets for a remote control device includes codeset information blocks for derivative codesets and codeset information blocks for nonderivative codesets. A codeset information block for a derivative codeset includes: a bit indicating that the block is for a derivative codeset, a plurality of bits each of which corresponds to a respective one of a plurality of fields in a referenced codeset information block, and a pointer that points to the referenced codeset information block. The digital value of a bit determines whether information from the corresponding field in the referenced block will be used as part of the derivative codeset or whether such information is contained in the derivative codeset information block itself. The sizes of the fields in the referenced block are predetermined or are determinable, so a field in the referenced block can be located if its bit is set in the referencing block.

20 Claims, 10 Drawing Sheets

| Field Number | Field Name | Size (bytes) | Format |
|---|---|---|---|
| N/A | Size | 1 | Byte indicating the size of the following codeset in bytes |
| N/A | Descriptor | 1-7 | Determines whether a derivative codeset or an alternative key mask. |
| 1 | Bit Pattern | 1 | Index to a snippit of indices corresponding to a bit of a key code. |
| 2 | Carrier | 2 | Carrier ON/OFF timing to 0.5uS |
| 3 | Raw Mark Table | 2 to 14 | Raw mark times used in this codeset (before crunching). |
| 4 | Raw Space Table | 2 to 16 | Raw space times used in this codeset (before crunching). |
| 5 | Key Mask | 1+ | Keys available in this codeset |
| 6 | System Code | 1+ | The system code for this codeset |
| 7 | Key Codes | 1+ | The key codes for this codeset |
| 8 | Pattern | 2+ | Pattern for the signal format |

FIG. 2

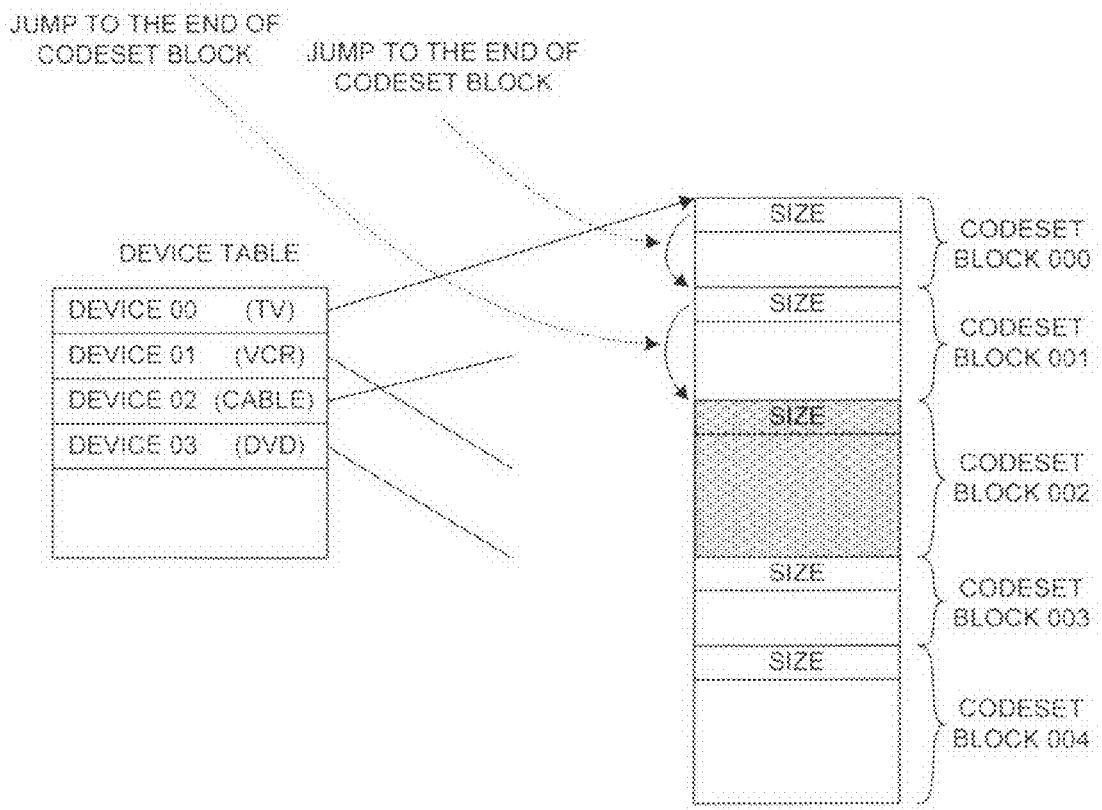

FIG. 3

Device number in r5= 0
Codeset number in rr0= 2

; find start of device
```
        ld      r2,     #> device_index_table    ; load the start of the device table into rr2
        ld      r3,     #< device_index_table
        rl      r5                                ; double r5 for word offset
        add     r3,     r5                        ; add offset to start of table
        adc     r2,     #0                        ; and carry
        ldc     r4,     @rr2                      ; get first byte of address, temp store to r4
        incw    rr2                               ; increment rr2 pointer
        ldc     r3,     @rr2                      ; get low byte of address
        ld      r2,     r4                        ; move high byte of address from temp
```

; first codeset address now in rr2, required codeset number in rr0

```
loop_search_codeset:
        sub     r1,     #01                       ; decrement required codeset number
        sbc     r0,     #0
        jr      nc,     found_codeset             ; if carry then codeset found
return_search_codeset:
        ldc     r4,     @rr2                      ; load size of codeset into r4
        add     r3,     r4                        ; add size to current codeset address
        adc     r2,     #0
        jr      loop_search_codeset               ; loop
``` device_index_table:
 .word START_DEVICE_0
 .word START_DEVICE_1
 .word START_DEVICE_2
 .word START_DEVICE_3

START_DEVICE_0:

Device_0_Codeset_0:
        .byte   %12
        ...
        ...
        ...

Device_0_Codeset_1:
        .byte   %22
        ...
        ...
        ...

Device_0_Codeset_2:
        .byte   %14
        ...
        ...
        ...

FIG. 4

| Derivative Bit | Alt Key Mask Bit | Num Marks | | | Num Spaces | | |
|---|---|---|---|---|---|---|---|
| 0/1 | 0/1 | N2 | N1 | N0 | N2 | N1 | N0 |

FIG. 5

| Derivative Bit | Alt Key Mask Bit | Num Marks | | | Num Spaces | | |
|---|---|---|---|---|---|---|---|
| 1 | 0 | N2 | N1 | N0 | N2 | N1 | N0 |

| Bit Pattern | Carrier | Marks | Spaces | System | Key Mask | Key Data | Pattern |
|---|---|---|---|---|---|---|---|
| 1/0 | 0/1 | 1/0 | 1/0 | 1/0 | 1/0 | 1/0 | 1/0 |

| Referenced codeset address HIGH | | | | | | | |
|---|---|---|---|---|---|---|---|
| A15 | A14 | A13 | A12 | A11 | A10 | A9 | A8 |

| Referenced codeset address LOW | | | | | | | |
|---|---|---|---|---|---|---|---|
| A7 | A6 | A5 | A4 | A3 | A2 | A1 | A0 |

FIG. 6

```
Device_0_Codeset_0:
        .byte %49                           ; size of this codeset
        .byte %0B                           ; nonderivative codeset, 1 marks,3 spaces
        .byte %03                           ; bit pattern index
        .byte %09, %1A                      ; Carrier on/off
        .word %00E0                         ; Mark table
        .word %0581, %0351, %0C11           ; Space table
        .byte %00                           ; System data
        .byte %FF, %FF, %FF, %FF, %FF, %F0  ; Key mask
        .byte %06, %44, %41, %46, %20, %92, %8C, %34, %E0, %9A, %79, %97, %55, %5C, %B5, %10, %71,
%80, %16, %49, %B8, %A3, %7E, %49, %66, %C4, %3C, %9F, %86, %0A, %6A, %AE, %CF, %F8, %E7, %EC,
%43, %CA, %08, %76, %DF, %CF, %7A, %EF, %5D, %33, %BA, %FC, %28, %4E, %40, %67, %40      ; key codes
        .byte %02, %FC, %06, %C0, %83       ; pattern
Device_1_Codeset_157:
        .byte %49                           ; size of this codeset (73 bytes)
        .byte %0B                           ; nonderivative codeset, 1 marks,3 spaces
        .byte %03                           ; bit pattern index
        .byte %09, %1A                      ; Carrier on/off
        .word %00C9                         ; Mark table
        .word %0581, %0351, %0C11           ; Space table
        .byte %00                           ; System code
        .byte %FF, %FF, %FF, %FF, %FF, %F0  ; Key mask
        .byte %06, %44, %41, %46, %20, %92, %8C, %34, %E0, %9A, %79, %97, %55, %5C, %B5, %10, %71,
%80, %16, %49, %B8, %A3, %7E, %49, %66, %C4, %3C, %9F, %86, %0A, %6A, %AE, %CF, %F8, %E7, %EC,
%43, %CA, %08, %76, %DF, %CF, %7A, %EF, %5D, %33, %BA, %FC, %28, %4E, %40, %67, %40; Key codes
        .byte %02, %FC, %06, %C0, %83       ; pattern
```

FIG. 7

```
Device_0_Codeset_0:
        .byte %07                     ; size of this codeset (7 bytes)
        .byte %8B                     ; derivative codeset, 1 marks,3 spaces
        .byte %DF                     ; derivative mask (all but mark table)
        .word Device_1_Codeset_157    ; template codeset
        .word %00E0                   ; Mark table
```

FIG. 8

| Derivative Bit | Alt Key Mask Bit | Num Marks | | | Num Spaces | | |
|---|---|---|---|---|---|---|---|
| 0 | 1 | N2 | N1 | N0 | N2 | N1 | N0 |

| Alternative Key mask (same format as standard key mask) | | | | | | | |
|---|---|---|---|---|---|---|---|
| 1/0 | 0/1 | 1/0 | 1/0 | 1/0 | 1/0 | 1/0 | 1/0 |

| Alternative codeset address HIGH | | | | | | | |
|---|---|---|---|---|---|---|---|
| A15 | A14 | A13 | A12 | A11 | A10 | A9 | A8 |

| Alternative codeset address LOW | | | | | | | |
|---|---|---|---|---|---|---|---|
| A7 | A6 | A5 | A4 | A3 | A2 | A1 | A0 |

FIG. 9

| Derivative Bit | Alt Key Mask Bit | Num Marks | | | Num Spaces | | |
|---|---|---|---|---|---|---|---|
| 1 | 1 | N2 | N1 | N0 | N2 | N1 | N0 |

| Bit Pattern | Carrier | Marks | Spaces | System | Key Mask | Key Data | Pattern |
|---|---|---|---|---|---|---|---|
| 1/0 | 0/1 | 1/0 | 1/0 | 1/0 | 1/0 | 1/0 | 1/0 |

| Referenced codeset address HIGH | | | | | | | |
|---|---|---|---|---|---|---|---|
| A15 | A14 | A13 | A12 | A11 | A10 | A9 | A8 |

| Referenced codeset address LOW | | | | | | | |
|---|---|---|---|---|---|---|---|
| A7 | A6 | A5 | A4 | A3 | A2 | A1 | A0 |

| Alternative Key mask (same format as standard key mask) | | | | | | | |
|---|---|---|---|---|---|---|---|
| 1/0 | 0/1 | 1/0 | 1/0 | 1/0 | 1/0 | 1/0 | 1/0 |

| Alternative codeset address HIGH | | | | | | | |
|---|---|---|---|---|---|---|---|
| A15 | A14 | A13 | A12 | A11 | A10 | A9 | A8 |

| Alternative codeset address LOW | | | | | | | |
|---|---|---|---|---|---|---|---|
| A7 | A6 | A5 | A4 | A3 | A2 | A1 | A0 |

FIG. 10

```
RC6_RC5_Codeset:
        .byte   %08                 ; size of this codeset (8 bytes)
        .byte   %C0                 ; derived codeset and alternative key mask
        .byte   %FF                 ; derive all from RC6
        .word   RC6_Codeset         ; derivative template address
        .byte   %40                 ; alternative key mask (power only)
        .word   RC5_Codeset         ; alternative codeset
```

FIG. 11

```
TV_KEYS:                                    VCR_KEYS:
        .byte   KEY_POWER                           .byte   KEY_POWER
        .byte   KEY_VOLUME_UP                       .byte   KEY_PLAY
        .byte   KEY_VOLUME_DOWN                     .byte   KEY_STOP
        .byte   KEY_CHANNEL_UP                      .byte   KEY_REWIND
        .byte   KEY_CHANNEL_DOWN                    .byte   KEY_FFWRD
        .byte   KEY_VOLUME_MUTE                     .byte   KEY_PAUSE
                                                    .byte   KEY_REC
```

FIG. 12

```
COMBO_KEYS:
        .byte   KEY_POWER           ; uses same code as TV_Codeset
        .byte   KEY_VOLUME_UP
        .byte   KEY_VOLUME_DOWN
        .byte   KEY_CHANNEL_UP
        .byte   KEY_CHANNEL_DOWN
        .byte   KEY_VOLUME_MUTE
        .byte   KEY_PLAY
        .byte   KEY_STOP
        .byte   KEY_REWIND
        .byte   KEY_FFWRD
        .byte   KEY_PAUSE
        .byte   KEY_REC
```

FIG. 13

```
TV_Codeset:
        .byte %35                   ; size of this codeset (53 bytes)
        .byte %16                   ; nonderivative codeset, 2 marks,6 spaces
        .byte %03                   ; bit pattern
        .byte %0F, %23              ; Carrier on/off
        .word %011D, %1194          ; Mark table
        .word %0366, %0118, %0465, %08C0, %5014, %B98C          ; Space table
        .byte %02, %AA, %AA         ; System code
        .byte %FE                   ; Key mask
        .byte %08, %7F, %3F, %5F, %1F, %6F, %F7, %AF, %6D,
%AD, %60, %FF, %E7, %05, %FC, %DC, %BC                          ; key codes
        .byte %13, %FB, %08, %FC, %08, %03, %82, %12, %05, %C0, %83   ; pattern VCR_Codeset:
        .byte %33                   ; size of this codeset (51 bytes)
        .byte %D4                   ; nonderivative codeset, 2 marks,4 spaces
        .byte %21                   ; bit pattern
        .byte %11, %12              ; Carrier on/off
        .word %00FA, %07D0          ; mark table
        .word %01F4, %03E8, %07D0, %0FA0          ; Space table
        .byte %01, %F0              ; system code
        .byte %FF, %80              ; key mask
        .byte %08, %00, %01, %02, %03, %04, %05, %06, %07, %08, %09, %F5, %FF,
%29, %81, %41, %C1, %45             ; key codes
        .byte %12, %FB, %08, %FC, %08, %FB, %08, %FC, %08, %03, %C0, %83    ; pattern COMBO_Codeset:
        .byte %09                   ; size of this codeset (8 bytes)
        .byte %C0                   ; derived codeset and alternative key mask
        .byte %FB                   ; derive all but key mask from VCR_Codeset
        .word VCR_Codeset           ; referenced codeset address for derivative codeset
        .byte %FE                   ; alternative key mask (all TV keys)
        .word TV_Codeset            ; alternative codeset (address of the TV codeset)
        .byte %C1, %FC              ; key mask for combo VCR keys
```

FIG. 14

```
Device_1_Codeset_15:
        .byte %35              ; size of this codeset (53 bytes)
        .byte %16              ; nonderivative codeset, 2 marks,6 spaces
        .byte %03              ; bit pattern
        .byte %0F, %23         ; Carrier on/off
        .word %011D, %1194     ; Mark table
        .word %0366, %0118, %0465, %08C0, %5014, %B98C     ; Space table
        .byte %02, %AA, %AA    ; System code
        .byte %FE              ; Key mask
        .byte %08, %00, %01, %02, %03, %04, %05, %06, %07, %08, %09, %10, %11, %12, %13,
%14, %15 ; Key Codes
        .byte %13, %FB, %08, %FC, %08, %03, %82, %12, %05, %C0, %83     ; pattern Device_1_Codeset_147:
        .byte %35              ; size of this codeset (53 bytes)
        .byte %16              ; nonderivative codeset, 2 marks,6 spaces
        .byte %03              ; bit pattern
        .byte %0F, %23         ; Carrier on/off
        .word %011D, %1194     ; Mark table
        .word %0366, %0118, %0465, %08C0, %5014, %B98C     ; Space table
        .byte %02, %AA, %AA    ; System code
        .byte %FE              ; Key codes
        .byte %08, %00, %01, %02, %03, %04, %05, %06, %07, %08, %09, %F5, %FF, %29, %81,
%41, %C1, %45 ; key codes
        .byte %13, %FB, %08, %FC, %08, %03, %82, %12, %05, %C0, %83     ; pattern
```

FIG. 15

```
Device_1_Codeset_15:
        .byte %1B                      ; size of this codeset (27 bytes)
        .byte %D6                      ; derivative codeset, alternative codeset,2 marks,6 spaces
        .byte %F9                      ; derive all but the key mask and the data
        .word Device_1_Codeset_147     ; pointer to referenced codeset
        .byte %80                      ; alternative key mask (digit keys only)
        .word Device_1_Codeset_147     ; pointer to alternative codeset
        .byte %7E                      ; Key mask
        .byte %08, %10, %11, %12, %13, %14, %15                         ; Key codes
        .byte %13, %FB, %08, %FC, %08, %03, %82, %12, %05, %C0, %83     ; pattern Device_1_Codeset_147:
        .byte %35              ; size of this codeset (53 bytes)
        .byte %16              ; nonderivative codeset, 2 marks,6 spaces
        .byte %03              ; bit pattern
        .byte %0F, %23         ; Carrier on/off
        .word %011D, %1194     ; Mark table
        .word %0366, %0118, %0465, %08C0, %5014, %B98C     ; Space table
        .byte %02, %AA, %AA    ; System data
        .byte %FE              ; Key mask
        .byte %08, %00, %01, %02, %03, %04, %05, %06, %07, %08, %09, %F5, %FF,
%29, %81, %41, %C1, %45; key codes
        .byte %13, %FB, %08, %FC, %08, %03, %82, %12, %05, %C0, %83     ; pattern
```

FIG. 16

```
PPMA_PATTERN:
        .byte   %11             ; 1 bit to interpret, 1 byte of indices
        .byte   %00             ; binary 0 indices
        .byte   %01             ; binary 1 indices
```

FIG. 17

```
PPMB_PATTERN:
        .byte   %11             ; 1 bit to interpret, 1 byte of indices
        .byte   %A8             ; binary 0 indices (space only)
        .byte   %01             ; binary 1 indices
```

FIG. 18

```
PPMC_PATTERN:
        .byte   %11             ; 1 bit to interpret, 1 byte of indices
        .byte   %A8             ; binary 0 indices (space only)
        .byte   %AC             ; binary 1 indices (mark only)
```

FIG. 19

```
PWMA_PATTERN:
        .byte   %11             ; 1 bit to interpret, 1 byte of indices
        .byte   %00             ; binary 0 indices
        .byte   %10             ; binary 1 indices
```

FIG. 20

```
PWMB_PATTERN:
        .byte   %11             ; 1 bit to interpret, 1 byte of indices
        .byte   %00             ; binary 0 indices
        .byte   %11             ; binary 1 indices
```

FIG. 21

```
BPPPM_PATTERN:
        .byte   %12             ; 1 bit to interpret, 2 bytes of indices
        .byte   %A8,%AC         ; binary 0 indices (space only followed by mark only)
        .byte   %00,%FF         ; binary 1 indices (mark space followed by a blank)
```

FIG. 22

```
MPPPM_PATTERN:
        .byte   %13                 ; 1 bit to interpret, 3 bytes of indices
        .byte   <00><01><02>        ; binary 0 indices
        .byte   <01><02><00>        ; binary 1 indices
```

FIG. 23

```
4PPM_PATTERN:
    .byte    %24                        ; 2 bits to interpret, 4 bytes of indices
    .byte    %00,%A8,%A8,%FF            ; binary 00 indices- mark space followed by two space only
    .byte    %A8,%00,%A8,%FF            ; binary 01 indices- space only, mark space, space only
    .byte    %A8,%A8.%00,%FF            ; binary 10 indices- two space only followed by mark space
    .byte    %A8,%A8,%A8,%AC            ; binary 11 indices- three space only and one mark only
```

FIG. 24

```
2M2S_PATTERN:
    .byte    %21            ; 2 bits to interpret, 1 byte of indices
    .byte    %00            ; binary 00 indices
    .byte    %01            ; binary 01 indices
    .byte    %10            ; binary 10 indices
    .byte    %11            ; binary 11 indices
```

FIG. 25

| 7 | 6 | 5 | 4 | 3 | 2 | 1 | 0 | Element description |
|---|---|---|---|---|---|---|---|---------------------|
| 0 | M2 | M1 | M0 | Long | S2 | S1 | S0 | Standard mark space |
| 1 | 0 | T1 | T0 | R3 | R2 | R1 | R0 | Control byte, Type T1|T0, repeat R3|R2|R1|R0 |
| 1 | 0 | 0 | 0 | R3 | R2 | R1 | R0 | EORF (end of repeat frame) |
| 1 | 0 | 0 | 1 | X | X | X | X | EOF |
| 1 | 0 | 1 | 0 | X | X | X | X | EOT |
| 1 | 0 | 1 | 1 | X | X | X | X | Spare |
| 1 | 1 | X | X | X | X | X | X | Level 2 database pattern element |
| 1 | 1 | 0 | X | X | X | X | X | Data section |
| 1 | 1 | 0 | 0 | 0 | COMP | ALT | OSET=0 | System code segment |
| 1 | 1 | 0 | 0 | 1 | COMP | ALT | OSET=0 | Key code segment |
| 1 | 1 | 0 | 1 | 0 | COMP | ALT | OSET=0 | Toggle data segment |
| 1 | 1 | 0 | 1 | 1 | 0 | 0 | 0 | Standard pattern |
| 1 | 0 | 1 | 0 | 1 | S2 | S1 | S0 | Space only |
| 1 | 1 | 1 | 0 | 1 | M2 | M1 | M0 | Mark only |
| 1 | 1 | 1 | 1 | 17th | S2 | S1 | S0 | Fixed frame space only |

FIG. 26

COMPRESSED CODESET DATABASE FORMAT FOR REMOTE CONTROL DEVICES

CROSS REFERENCE TO RELATED APPLICATION

This application is a continuation of, and claims priority under 35 U.S.C. §120 from, nonprovisional U.S. patent application Ser. No. 11/190,162 entitled "Compressed Codeset Database Format For Remote Control Devices," filed on Jul. 26, 2005, now U.S. Pat. No. 7,855,672, the subject matter of which is incorporated herein by reference. Application Ser. No. 11/190,162 in turn claims the benefit under 35 U.S.C. §119(e) of provisional U.S. patent application Ser. No. 60/603,359, entitled "Compressed Codeset Database Format For Remote Control Devices," by Adam P. G. Provis, filed on Aug. 19, 2004, the subject matter of which is incorporated herein by reference.

TECHNICAL FIELD

The present invention relates to a compressed format for storing codeset information for generating IR operational signals, such as those transmitted from an IR remote control device.

BACKGROUND

An IR remote control device typically transmits IR operational signals that are received by an electronic consumer device. A user operates and controls the electronic consumer device by pressing an appropriate key on the remote control device. Pressing the key causes an IR operational signal to be transmitted to the electronic consumer device. The electronic consumer device responds by taking an action desired by the user. A codeset defines the possible IR operational signals that can be output from the remote control device when the keys on the remote control device are pressed. A particular codeset may be usable to control multiple models and brands of an electronic consumer device. A particular codeset may control more than one type of electronic consumer device. Accordingly, a remote control device typically stores a database of codesets. The user of the remote control device can configure the remote control device such that one of the codesets is used to control a first type of device (for example, a television), and such that a second one of the codesets is used to control a second type of device (for example, a VCR). Because it is desired that the remote control device be usable to control any one of the multitude of electronic consumer devices on the market, the number of codesets stored in the remote control device is typically large and requires an undesirably large amount of memory. Providing this memory adds to the cost of the remote control device. It is therefore desirable to be able to reduce the amount of memory required to store the database of codesets.

One particular database of codesets is a block of packed binary data that includes a "codeset information portion" for each codeset, a "modulation and timing protocol information portion", and a "codeset selection criteria portion". The codeset information portion includes, for each codeset, key codes, key flags, a system code, format and size information, and a protocol number. The protocol number points to one of multiple "protocols" in the modulation and timing protocol information portion.

A protocol contains information about how to generate an operational signal including the carrier frequency (if applicable), the encoding pattern, timing information, and information on the general structure of the signal. In the particular database format described here, the protocols are separated from the codeset information because many codesets may use the same protocol. Providing the protocols separate from the codeset information allows a more efficient use of memory space on the remote control device.

An encoding pattern defines the way the binary information in a key code is formatted for transmission with respect to the timing information within the protocol. In the particular database format described here, these patterns are defined by separate sections of software drivers which are selected when the protocol is examined. There are typically many protocols that use each encoding pattern.

FIG. 1 (prior art) illustrates how indexing of the database is done using a number that indicates the type of device to be controlled (eg. TV, VCR), a codeset number (eg. 0001, 0002), and the key pressed. When a key is pressed on a remote control device, the following information is known: the type of device to be controlled is known by a device number (for example, "00" for TV, "01" for VCR), the number of the codeset is known (for example, code number "002" of the subset of codesets usable to control the device type), and an indication of the particular key (for example, the "1" key) on the remote control device that was pressed down. First, the entry in the device table for the type of device to be controlled is consulted. This two byte entry points to the start of a device index table for the type of device to be controlled. In the example where the type of device to be controlled is a TV, then the device table points to the device index table for televisions. In the example where the codeset number is "002", the 002 entry in the TV code index table is consulted. This entry is a two byte pointer that points to one of the codeset blocks. In the present example, the codeset block pointed to is codeset block 001. The selected codeset block contains the digital key code for the particular key pressed. The codeset block also points to the protocol required. The protocol contains the timing and structure information and references the encoding scheme to be used in the generation of the operational signal.

Although the format described above works well, there is a desire to improve the format for reasons including the following: 1) To reduce the amount of memory space needed to store the database on the remote control device (even larger ROM size microcontrollers used on remote control devices today cannot sometimes store the required database), 2) To better support new code schemes that have recently come into use, especially code schemes that have recently come into use in Europe, 3) To work more closely with the next generation remote control devices that are realized as IR transmitting virtual machines, and 4) To allow for future expansion support for as yet undiscovered codes.

SUMMARY

In a first novel aspect, a size field in a codeset block is used to hop down through a sequence of codeset blocks to find the beginning of a selected codeset block, thereby doing away with the need for the device index table of the prior art.

In a second novel aspect, a database of codesets for a remote control device includes a plurality of codeset information blocks for derivative codesets and a plurality of codeset information blocks for nonderivative codesets. In one example, a codeset information block for a derivative codeset includes: a bit indicating that the block is for a derivative codeset, a plurality of bits each of which corresponds to a respective one of a plurality of fields or portions of a referenced codeset information block, and a pointer that points to the referenced codeset information block. The digital value of a bit (one of the plurality of bits) determines whether information from the corresponding field or portion in the referenced codeset information block will be used to define the derivative codeset or whether such information is contained in the present codeset information block itself. The sizes of the fields or portions in the referenced codeset information block are of predetermined known sizes or are determinable, so a field or portion in the referenced codeset block can be located if its bit is set in the referencing codeset block.

In order to generate an operational IR signal for a particular key on a remote control device that is pressed, the processor of the remote control device accesses a codeset information block of a database of codeset information blocks that is stored in ROM on the remote control device. The processor examines the derivative bit of the codeset information block, determines that the codeset information block is a derivative codeset information block, determines from the bits in the next byte (the "fields byte") which fields of information are to be incorporated from the referenced codeset information block, and then uses the address of the referenced codeset information block to access the referenced codeset information block. Because the various fields in the referenced codeset information block are of known fixed sizes, the processor can access the particular fields of information that correspond to the bits that are set in the fields byte. In one variation, a field of information in the referenced codeset information block is not of a known fixed size but rather is of a variable size that is specified by the first byte of the field. The processor reads the first byte of the first field, and from the size information finds the first byte of the second field. In this way, the processor steps through the fields of the referenced codeset information block until a field of information to be incorporated is reached. Regardless of how the field of information is identified (using the known field size technique, the variable specified field size technique, or a combination of the two), the processor identifies the field information to be incorporated and uses that information in combination with information in the referencing codeset information block to generate the operational IR signal for the particular key that was pressed.

In a third novel aspect, a codeset contains an alternative mask key and an indication of a referenced codeset (the referenced codeset block is sometimes called an "alternative codeset" block). The key codes for the certain keys identified by the alternative mask key are drawn from the referenced codeset and not the codeset block.

In a fourth novel aspect, a derivative codeset and the alternative mask key are used to define a codeset for a combo device, where some keys in the codeset for the combo device are defined by a first codeset, and wherein other keys in the codeset for the combo device are defined by a second codeset.

In a fifth novel aspect, snippits of indices (indices to a mark table and to a space table) are used to generate a string of timing information. One snippet is the "space only" snippit.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 illustrates sections of a codeset in accordance with one novel aspect.

FIGS. 3-4 illustrate an example of the accessing to the codeset Device_0_Codeset_2.

FIG. 5 illustrates the first byte of a descriptor field.

FIG. 6 illustrates bytes that are present if the derivative bit in the descriptor field is set.

FIG. 7 sets forth an example of two codesets.

FIG. 8 illustrates another way of writing the first codeset of FIG. 7.

FIG. 9 illustrates the descriptor when the alternative codeset feature is used (without a derivative codeset). The address of the referenced codeset block is labeled "Alternative codeset" HIGH and LOW.

FIG. 10 illustrates the codeset format if the codeset is both a derivative codeset and if the codeset employs the alternative key mask feature.

FIG. 11 is an example of a codeset with the RC6 protocol.

FIG. 12 illustrates an example of two key tables, one for a television and another for a VCR.

FIG. 13 illustrates a combo device key table.

FIG. 14 illustrates a codeset that emulates the combo device of FIG. 13.

FIG. 15 is an example of two codesets that are mostly the same apart from the key data for the non-digit keys.

FIG. 16 illustrates how one codeset can be piggybacked on top of another using the alternative codeset.

FIG. 17 sets forth an example of a PPM-A encoding pattern.

FIG. 18 sets forth an example of a PPM-B encoding pattern.

FIG. 19 sets forth an example of a PPM-C encoding pattern.

FIG. 20 sets forth an example of a PWM-A encoding pattern.

FIG. 21 sets forth an example of a PWM-B encoding pattern.

FIG. 22 sets forth an example of a BP_PPM encoding pattern.

FIG. 23 sets forth an example of a MP_PPM encoding pattern.

FIG. 24 sets forth an example of a 4 PPM encoding pattern.

FIG. 25 sets forth an example of a 2M2S encoding pattern.

FIG. 26 is a table of substitution codes for generating a string of timing information.

DETAILED DESCRIPTION

Figure 1:
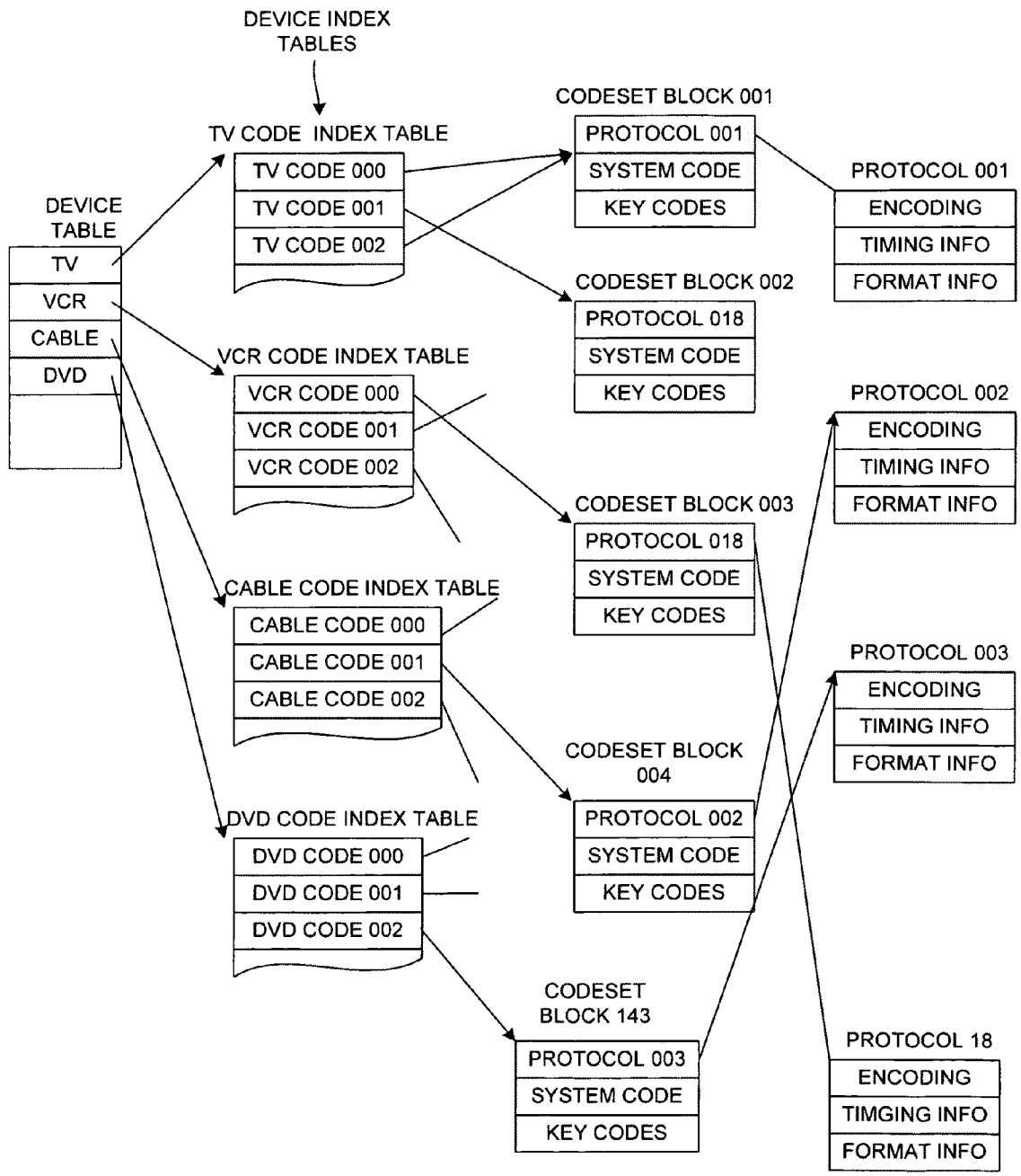
FIG. 1 (prior art) is a diagram that illustrates a codeset database format.

Reference will now be made in detail to some embodiments of the invention, examples of which are illustrated in the accompanying drawings.

In accordance with one novel aspect, an embedded database of codeset information is not separated into the blocks of codeset information and protocols of the database format of FIG. 1. The device index tables of the prior art database format of FIG. 1 are dispensed with such that the memory space that was required to store the device index tables is now available for other purposes.

FIG. 3 illustrates a codeset database having a new format in accordance with one novel aspect. The embedded database includes a contiguous list of codeset blocks in memory. Each codeset block contains all required information locally except that a codeset block may derive certain fields from other codesets. Each codeset block is made up of the sections set forth in FIG. 2. To avoid the large amount of memory space required to store the device index tables of the prior art format described above in the background section, each codeset block contains a one byte "size" field at the beginning that indicates the size (in bytes) of the entire codeset block. The database starts with a device table containing a two-byte pointer for each type of device to be controlled. The pointer for a device type points to the first codeset block for that device type. The software of the remote control device must then hop down from that first pointed to codeset block, codeset block by codeset block, until the codeset block having the required codeset number is reached.

FIG. 3 illustrates an example in which the device type is "TV" and the code number is "002". Software hops to codeset block "000", uses the size field of codeset block "000" to locate the beginning of codeset block "001", uses the size field of codeset block "001" to locate the beginning of codeset block "002". Although a one-byte size field is added to each codeset block in comparison to the format of FIG. 1, the total memory space occupied by the novel database may be reduced because the two-byte pointers of the device index tables of the prior art database are dispensed with.

FIG. 4 illustrates an example in which the processor of a remote control device accesses the codeset information block Device_0_Codeset_2. Although this accessing will take extra processing time to find the codeset information block, this is at a non-critical period (before the IR operational signal has started and is not noticeable to the user). For 1000 codesets search, (58*999)+24=57966 clock cycles=14.4 mS. By employing this index scheme, each codeset index is reduced from two bytes to one byte. Dummy codesets can be represented by a dummy descriptor and will still take two bytes as set forth below.

Dummy_Device:
.byte %02; size of dummy codeset
.byte %00; dummy descriptor

Pros and cons of the prior art index structure set forth in the background section include: 1) easy to index fast for the processor, 2) flexible—many to one structure, 3) easy to change (by hand if necessary), 4) it is slightly inefficient (uses two bytes for every code table reference). Pros and cons of the new index structure include: 1) saves approximately one byte for each codeset in comparison with the prior art structure, 2) more processing time is required to find the wanted codeset block, 3) a many-to-one structure is possible with using derivative codesets, and 4) it is difficult to change the database by hand.

Derivative Codesets

A derivative codeset is a codeset that derives one or more of its fields from another codeset in the database. As illustrated in FIG. 2, the second field in the codeset block is the "descriptor" field. The first byte of the descriptor field is formatted as illustrated in FIG. 5. The first bit (MSB) of the descriptor field is the derivative bit. The derivative bit indicates whether the codeset is a derivative codeset and derives one or more fields from another codeset, or whether the codeset is a nonderivative codeset. If the derivative bit is set to a "1" (and not the Alt Key Mask bit), then the codeset is a derivative codeset and the bytes illustrated in FIG. 6 are present. As illustrated in FIG. 6, the second byte is a byte called the "fields byte". The fields byte is a list of bits, where each bit corresponds to a field of information in the codeset that can be derived from (i.e., incorporated from) a referenced codeset. The first bit is associated with the bit pattern field, the second bit is associated with the carrier field, as so forth. If one of the bits is set to a "1", then the information of the associated field is borrowed from (i.e., incorporated from) the referenced codeset block. If the bit is "0", then the information is not borrowed from the referenced codeset block but rather is supplied in the present codeset block.

The next two bytes (see FIG. 6) constitute a pointer that points to (for example, a 16-bit address that identifies) the referenced codeset information block (the codeset information block from which one or more fields are being borrowed).

FIG. 7 illustrates an example involving two codesets that contain similarities. One codeset is denoted Device_0_Codeset_0. The other codeset is denoted Device_1_Codeset_157. The two codesets are almost identical except for the fact that the mark time is different.

FIG. 8 illustrates how the first codeset could be defined using the derivative bit aspect of the present invention. The first byte is "07" and indicates the size of the codeset information block. The second byte is "8B". The first bit of the second byte is a "1", thereby indicating that the codeset is a derivative codeset. The next byte (which is called the "fields byte") is "DF". "DF" is "11011111". The zero bit in "DF" corresponds to the mark field as indicated in FIG. 6. All the other bits are "1", indicating that information from all the associated fields (fields associated with the "1" bits) are borrowed from the referenced codeset. The next word (two bytes) is a sixteen-bit value that identifies the referenced codeset information block, codeset Device_1_Codeset_157. The last word is "00E0" which is the mark field information that was not borrowed from the referenced codeset information block.

In one embodiment, the sizes of the fields in the referenced codeset information block are of predetermined known sizes, so a field in the referenced codeset block can be located if its bit is set in the fields byte in the referencing codeset block.

As can be seen, the use of the derivative bit reduced the amount of memory needed to store the definition of the codeset by sixty-six bytes. The majority of the codeset information is derived (i.e., incorporated) from the referenced codeset information block. Furthermore, the referenced codeset information block Device_1_Codeset_157 could in turn derive some fields from another codeset information block, thereby forming a chain of derivatives and as long as care is taken not to make a mutual derivative. Preferably the database of codeset information blocks does not just contain an incidental number of derivative codesets, but rather a substantial proportion (for example, twenty-five percent or more) of all the codesets in the database are derivative codesets. It is possible to make a database of codeset information blocks where a particular value of a particular field is only stated once in the entire database. Where the database of codeset information blocks is stored in a computer readable medium (for example, semiconductor memory, magnetic media, and/or optical media), the amount of the computer readable medium necessary to store the database is reduced. In a remote control device for controlling a consumer electronic device where the production cost of the remote control device is extremely cost sensitive and where the database is stored in semiconductor memory such as mask-programmable ROM (mask programmable read-only-memory), the reduction in the amount of semiconductor memory that needs to be included in the remote control device to store the database of codesets is reduced, thereby advantageously reducing the production cost of the remote control device. The database of codesets can be parsed and traversed using a virtual machine such as the one described in U.S. patent application Ser. No. 10/928,576, now U.S. Pat. No. 7,286,076, and then the identified and extracted information can be used by the virtual machine to generate an IR operational signal that is transmitted from the remote control device.

Pros and cons of the prior art protocol structure include: 1) easy to index—fast for the processor of the remote control device, 2) efficiently defines common codesets with exactly the same characteristics, 3) easy to change (by hand if necessary), 4) a drawback is that a new protocol is required for any difference in timing, pattern, carrier, etc., 5) another drawback is that the many protocol to a single codeset mapping is not possible. Pros and cons of the new derivative codeset database structure include: 1) makes common any field from any place in the database, 2) slight differences cause a minimum of extra code, 3) many protocol to single codeset possible, 4) a drawback is that more processing time is required by the processor to find the required fields, 5) another drawback is that it is difficult to change by hand.

Alternative Key Masks

The alternative key mask is a mechanism by which a first codeset that does not contain a definition for a key may use the definition for that key that appears in a referenced codeset. Consider a situation in which a power key is pressed and the codeset contains no key code for the power key. In such a situation, a conventional remote control device would look to the codeset, recognize that there is no corresponding key code, and consequently the remote control device would take no further action. By using an alternative key mask, a definition of what to do when the power key is pressed is derived from a different codeset (the "alternative" codeset or the "referenced" codeset). In short, it is like a "punch through" function native to the database.

FIG. 9 illustrates the format of the codeset if the alternative codeset feature is used (without the derivative codeset feature). The digital "1" in the "Alt Key Mask" bit position in the first byte of the "descriptor field" of the codeset identifies the alternative mask function as being used. In this situation, the next byte is the alternative key mask. Each bit in the alternative key mask is associated with a particular key on the remote control device. If a bit in the key mask is a "0", then the corresponding key does not have a key code in this codeset and what to do when the key is pressed is determined by a referenced codeset information block. The referenced codeset information block is identified by the following two bytes.

FIG. 10 illustrates the format of the descriptor field of the codeset information block when a codeset information block has both its derivative bit set and its alternative key mask bit set. The second, third and fourth bytes are for the derivative feature. The address of the referenced codeset information block for the derivative feature is found in the third and fourth bytes. The fifth, sixth and seventh bytes are for the alternative key mask feature. The address of the referenced codeset information block (also called the "alternative codeset" information block) for the alternative key mask feature is found in the sixth and seventh bytes.

Use for Hybrid Codesets

FIG. 11 illustrates an example in which a codeset uses the RC6 protocol except for the power key. The operational signal for the power key is transmitted using an RC5 protocol. The RC6 key codes are assumed to be identical to the key codes in the "RC6_Codeset." The definition of what to do when the power key is pressed is set forth in a codeset called "RC5_Codeset".

The second byte of the descriptor field is "C0". This indicates that the codeset is a derivative codeset and that the codeset has an alternative key mask. When any key is pressed that is not in the alternative key mask, the codeset will act exactly as the RC6_Codeset would react. However, when the power key is pressed, the key is sighted in the alternative key mask and the alternative codeset (RC5_Codeset) is used to determine how to generate the operational signal.

Use for Combo Devices

Another example of where this feature can be used is for a combo device. An example of a combo device is a TV that includes a built-in VCR. The TV portion of the combo device uses a TV codeset (TV_Codeset), whereas the VCR portion of the combo device uses a VCR codeset (VCR_Codeset).

FIG. 12 illustrates the key tables for the two parts of the combo device. The codeset Codeset_TV has digit keys but they are not present in the codeset for the VCR.

FIG. 13 illustrates a combo device key table.

FIG. 14 illustrates the two codesets (TV_Codeset) and (VCR_Codeset) as well as the combo codeset (COMBO_Codeset). For the purpose of this example, it is assumed that the digit keys are present on both devices and that the combo device uses the TV_Codeset to generate operational signals for the digit keys. To make a codeset which fully emulates the combo codeset, the alternative codeset is used for the keys on one device and the remaining keys are derived from the other device.

Suppose a VCR key "KEY_PLAY" is pressed on the combo device. The key offset for this key in the combo key table is sixteen (which is the MSBit of the second byte in the key mask). A keycode for this key is not present in the alternative codeset and so the standard key mask is checked. KEY_PLAY is present in the standard key mask and the derived codeset VCR_Codeset is employed with the key mask given.

The offset for KEY_PLAY according to the VCR key table is eleven and the key mask for the VCR_Codeset is % FF, %80. This is why the key mask of VCR_Codeset is not derived along with everything else because the key offset for KEY_PLAY is sixteen. Using the combo device key mask (% Cl, % FC) we find that offset sixteen is the eleventh key present and this naturally adjusts to the VCR_Codeset data order.

Now suppose the TV key "KEY_VOLUME_UP" is pressed on the combo device. The key offset for this key in the combo key table is eleven (which is bit 5 of the first byte in the key mask). This is present in the Alternative Key Mask and so we use the TV_Codeset instead. The KEY_VOLUME_UP key offset for the TV_Codeset is the same as that of the combo codeset and so the data order is correct.

Use for Optimization

In an embedded IR codeset database, there are normally many instances of codesets which use identical protocols and have key codes that are subsets of another codeset's key code data in whole or part. Because the key code data area occupies a large proportion of the memory space occupied by a codeset, large savings can be made by using the alternative codeset principle to common key code data. The address of the referenced codeset block is normally given as a sixteen bit address within the ROM of the remote control device. If, however, this value is given as %0000, then the referenced codeset block is considered to be the "calling" codeset block (the codeset block which derived it from an alternative codeset block).

FIG. 15 illustrates two codeset information blocks. These codeset information blocks are mostly the same apart from the key code data for non-digit keys. Note that the line starting ".byte %08, %00, %01 . . . " in the codeset information block Device_1_Codeset_15 starts the same way that the line starting ".byte %08, %00, %01 . . . " in the codeset information block Device_1_Codeset_147. In each case, the "%08" indicates the length in bits of each key code to follow. The following key code data information is for the keys "0", "1", "2" . . . "9". The key codes here are the same as the numbers printed on the keys on the remote control device. (Note, however, that the key codes for the keys following the "9" key differ in the two codesets.)

FIG. 16 illustrates one novel aspect in which one of the codesets uses the key codes for the keys "0", "1", "2" . . . "9"

from the codeset information block of the other codeset. In the codeset Device_1_Codeset_15, the byte "7E" has its first bit being a "0". This indicates that the key codes for the "digit keys" ("0", "1", "2" . . . "9") are not present in the present codeset block, but rather that the key codes for the digit keys are found in the referenced codeset block. The last bit (of "7E") being a "0" indicates that this byte is the last key mask byte within the present codeset block. (Had the last bit been a "1", then a second key mask byte would have been present.) The next line starting with ".byte %08, %10, %11, %12 . . . " sets forth the key codes for the non-digital keys that are not being lifted from (i.e., are not being incorporated from) the referenced codeset block.

Bit Pattern

A conventional IR transmission engine of a remote control device has many "encoding schemes" which are realized as separate software functions. Each such software function interprets key codes and encodes them in a certain format.

In accordance with one novel aspect, the new database format does not rely on such software functions. Rather, it generates a sequence of indices. Each such index is an index to a mark time value in a mark table or is an index to a space time value in a space table. The referenced mark time values and space time values are then "crunched" as described below to generate a generic string of timing information, a mark table, and a space table.

The IR transmission engine uses the string of timing information, the mark table and the space table and generates therefrom the operational signal. For additional information on mark tables, space tables, the crunching of strings of mark and space times, the generation of operational signals by a virtual machine, and other information on remote control devices and codesets see: U.S. patent application Ser. No. 10/928,576, entitled "Generating A Mark/Space Table And A String Of Timing Information On A Remote Control Device", filed Aug. 27, 2004, by Provis et al., now U.S. Pat. No. 7,286,076 (the subject matter of which is incorporated herein by reference).

PPM-A Example

For example, take a PPM-A encoding. Suppose a binary '0' is represented by Mark0-Space0 and a binary '1' is represented by Mark0-Space1. The bit pattern reference in the codeset will give an offset to a bit pattern table containing the snippet of mark/space indices to substitute for each binary digit as illustrated in FIG. 17.

The first byte is split into two nibbles. The upper nibble indicates how many binary digits to interpret at once (how many states/2) and the lower nibble is how many bytes of indices for each state. As can be seen from the PPM-A pattern, one digit should be interpreted (a 0 or 1) and each substitution should substitute one byte. Suppose the key code is 01001101b, each individual bit of the key code will be substituted by the appropriate one-byte snippet of indices giving: %00, %01, %00, %00, %01, %01, %00, %01.

PPM-B Example

PPM-B uses a binary '0' as a space only (Space0) and a '1' as a mark/space pair (Mark0-Space1) as illustrated in FIG. 18. Suppose the key code is 01001101b, each individual bit will be substituted by the appropriate snippet of indices giving: % A8, %01, % A8, % A8, %01, %01, % A8, %01. This string of snippits is then further "crunched" as described below to generate a string of timing information, a mark table, and a space table.

PPM-C Example

PPM-C uses a single mark for a binary '1' and a single space for binary '0' as illustrated in FIG. 19. Suppose the key code is 01001101b, each individual bit will be substituted by the appropriate snippit of indices giving: % A8, % AC, % A8, % A8, % AC, % AC, % A8, % AC This string of snippits is then further "crunched" as described below.

PWM-A Example

PWM-A alters the mark time for a binary '0' or binary '1' but has a constant space time as illustrated in FIG. 20. Suppose the key code is 01001101b, each individual bit will be substituted by the appropriate snippit of indices giving: %00, %10, %00, %00, %10, %10, %00, %10.

PWM-B Example

Like PWM-A but altering the space time to give a constant period as illustrated in FIG. 21. Suppose the key code is 01001101b, each individual bit will be substituted by the appropriate snippit of indices giving: %00, %11, %00, %00, %11, %11, %00, %11.

BP_PPM Example

This is a Manchester encoding scheme. A transition from low to high is a binary '0' and a transition from high to low is a binary '1' as illustrated in FIG. 22. Suppose the key code is 01001101b, each individual bit will be substituted by the appropriate snippit of indices giving: % A8, % AC, %00, % A8, % AC, % A8, % AC, %00, %00, % A8, % AC, %00. This string of snippits is then further "crunched" as described below.

MP_PPM Example

For an MP_PPM example, see FIG. 23. Suppose the key code is 01001101b, each individual bit will be substituted by the appropriate snippit of indices giving: %00, %01, %02, %01, %02, %00, %00, %01, %02, %00, %01, %02, %01, %02, %00, %01, %02, %00, %00, %01, %02, %01, %02, %00.

4 PPM Example

For an 4 PPM example, see FIG. 24. Suppose the key code is 01001101b, each individual bit will be substituted by the appropriate snippit of indices giving:

% A8, %00, % A8, % FF, %00, % A8, % A8, % FF, % A8, % A8, % A8, % AC, % A8, %00, % A8, % FF. This string of snippits is then further "crunched" as described below.

2M2S Example

For an 2M2S example, see FIG. 25. Suppose the key code is 01001101b, each individual bit will be substituted by the appropriate snippit of indices giving:

%01, %00, %11, %01.

Crunching

In one embodiment, an IR transmission engine requires a string of mark space time values and space time values to transmit, wherein there are no two adjacent mark times in the string and wherein there are no two adjacent space time values in the string. Accordingly, if there are adjacent indices in the output of the encoding examples above (the string of snippits) that reference adjacent mark time values or adjacent space time values, then those adjacent values must be crunched together as follows.

Using the PPM-C example with a symbol at the front and an inter-frame delay, suppose we now have the following string: %00, % A8, % AC, % A8, % A8, % AC, % AC, % A8, % AC, % A9. Each reference A8 is a Space0 only and each reference AC is a Mark0 only. This can be crunched down as follows:

%02, %02, %10, %03. As extra mark times or space times are required (multiples of the existing times) they are added to the appropriate mark table or space table.

Mark1=2*Mark0

Space1=Inter frame delay time

Space2=2*Space0

The carrier is given in exactly the same way as the traditional database format. A baseband signal is denoted by %00, %00.

The mark table is an ordered list of mark time values which directly correspond to the indices in the string of indices in the string of timing information. The first mark time given is reference 0 and subsequent marks have sequential references up to reference 6. The number of marks given is declared in the descriptor. As set forth above, the mark table may be modified in the crunching process.

The space table is an ordered list of space time values which directly correspond to the indices in the string of indices in the string of timing information. The first space time given is reference 0 and subsequent spaces have sequential references up to reference 7. The number of spaces given is declared in the descriptor. As set forth above, the space table may be modified in the crunching process.

The key mask is given in exactly the same way as the traditional database format.

The system code field starts with a byte declaring how many bytes the system code is taking. The system code field is always rounded up to the next byte. This is then followed by that number of bytes for the data of the system code.

The key code field starts with a byte declaring how long each key code is in bits. This is then followed by packed binary in a similar format to the traditional database for each key.

The pattern field contains a value that defines the framework for the IR signal. It may be a script with windows for data or toggle functions. For example: %13, % FB, %08, % FC, %08, %03, %82, %12, %05, % C0, %83. This string is used substituting the following components.

% FB=insert system code, offset=0
%08=length of a system code=8
% FC=insert key code, offset=0
%08=length of a key code=8

When a symbol for inserting data is found, the data should be matched with the bit pattern and inserted. The full substitution codes are shown in FIG. 26.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method comprising:
   storing in a readable medium a first codeset information block and a second codeset information block, the first codeset information block including a first bit that is associated with a first portion of the second codeset information block, the first portion storing a first type of information, the first codeset information block also including a second bit that is associated with a second portion of the second codeset information block, the second portion storing a second type of information, wherein the first codeset information block also includes a pointer to the second codeset information block, and wherein the readable medium is taken from the group consisting of: a part of a microcontroller integrated circuit, a part of a personal digital assistant (PDA), a part of a cellular telephone, a part of a handheld remote control device for controlling an electronic consumer device, a part of a personal computer, a semiconductor memory device, a magnetic storage device, and an optical storage device; and
   using information of the first type to generate an operational signal, and wherein if the first bit has a first digital value then the information of the first type that is used is information of the first type that is part of the first codeset information block whereas if the first bit has a second digital value then the information of the first type that is used is information in the first portion of the second codeset information block.

2. The method of claim 1, wherein the said using information is performed by a virtual machine.

3. The method of claim 1, wherein the readable medium is part of a remote control device.

4. The method of claim 1, further comprising:
   using information of the second type to generate the operational signal, wherein if the second bit has a first digital value then the information of the second type that is used is information of the second type that is part of the first codeset information block whereas if the second bit has a second digital value then the information of the second type that is used is information in the second portion of the second codeset information block.

5. The method of claim 1, wherein the first codeset information block contains no information of the first type if the first bit has the second digital value, and wherein the first codeset information block contains no information of the second type if the second bit has the second digital value.

6. The method of claim 1, wherein said using involves reading the first bit and determining whether the information of the first type that is used will be the information of the first type that is part of the first codeset information block or whether the information of the first type that is used will be the information in the first portion of the second codeset information block.

7. The method of claim 6, wherein the first type of information is key code data information, the key code data information including a plurality of sequences of bits, each sequence of bits being for a respective one of a plurality of keys.

8. The method of claim 1, wherein the first type of information is a system code.

9. The method of claim 1, wherein the first type of information is carrier timing information.

10. The method of claim 1, wherein the operational signal is a serial digital signal.

11. The method of claim 1, wherein the pointer to the second codeset information block is an address.

12. The method of claim 1, wherein substantially all codeset information blocks stored in the readable medium that have a first portion have a first portion of an identical size.

13. The method of claim 1, wherein if the first bit has the second digital value, then no information is stored in the first codeset information block in any field for which the first bit indicates that information in a corresponding field in the second codeset information block is used to generate the operational signal.

14. The method of claim 1, wherein at least twenty-five percent of all codesets stored in the readable medium are derivative codesets.

15. A method comprising:
   storing in a readable medium a first codeset information block and a second codeset information block, the first codeset information block including a first bit that is associated with a first portion of the second codeset information block, the first portion storing a first type of information, the first codeset information block also including a second bit that is associated with a second portion of the second codeset information block, the second portion storing a second type of information, wherein the first codeset information block also includes a pointer to the second codeset information block, and wherein the readable medium is taken from the group consisting of: a part of a microcontroller integrated circuit, a part of a personal digital assistant (PDA), a part of a cellular telephone, a part of a handheld remote control device for controlling an electronic consumer device, a part of a personal computer, a semiconductor memory device, a magnetic storage device, and an optical storage device;

using information of the first type to generate an operational signal, and wherein if the first bit has a first digital value then the information of the first type that is used is information of the first type that is part of the first codeset information block whereas if the first bit has a second digital value then the information of the first type that is used is information in the first portion of the second codeset information block; and transmitting the operational signal to an electronic consumer device.

16. The method of claim 15, wherein the electronic consumer device is a combo device.

17. The method of claim 15, wherein the transmitting occurs as a result of a key press.

18. The method of claim 15, wherein the said using information is performed by a virtual machine.

19. The method of claim 15, wherein the readable medium is part of a remote control device.

20. A method comprising:

storing in a readable medium a first codeset information block and a second codeset information block, the first codeset information block including a first bit that is associated with a first portion of the second codeset information block, the first portion storing a first type of information, the first codeset information block also including a second bit that is associated with a second portion of the second codeset information block, the second portion storing a second type of information, wherein the first codeset information block is an information block for a derivative codeset and the second codeset information block is an information block for a nonderivative codeset, and wherein the readable medium is taken from the group consisting of: a part of a microcontroller integrated circuit, a part of a personal digital assistant (PDA), a part of a cellular telephone, a part of a handheld remote control device for controlling an electronic consumer device, a part of a personal computer, a semiconductor memory device, a magnetic storage device, and an optical storage device; and using information of the first type to generate an operational signal, and wherein if the first bit has a first digital value then the information of the first type that is used is information of the first type that is part of the first codeset information block whereas if the first bit has a second digital value then the information of the first type that is used is information in the first portion of the second codeset information block.

* * * * *